(12) United States Patent
Suenaga et al.

(10) Patent No.: US 9,036,384 B2
(45) Date of Patent: May 19, 2015

(54) POWER CONVERTER HAVING SEMICONDUCTOR SWITCHING ELEMENT

(75) Inventors: Haruo Suenaga, Osaka (JP); Nobuo Shirokawa, Shiga (JP); Hideaki Moriya, Shiga (JP); Manabu Kinoshita, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 302 days.

(21) Appl. No.: 13/518,715

(22) PCT Filed: Dec. 24, 2010

(86) PCT No.: PCT/JP2010/007496
§ 371 (c)(1),
(2), (4) Date: Jun. 22, 2012

(87) PCT Pub. No.: WO2011/077744
PCT Pub. Date: Jun. 30, 2011

(65) Prior Publication Data
US 2012/0262951 A1    Oct. 18, 2012

(30) Foreign Application Priority Data

Dec. 24, 2009  (JP) ................................. 2009-291724
Dec. 24, 2009  (JP) ................................. 2009-291725

(51) Int. Cl.
*H02H 7/122*   (2006.01)
*H02M 3/335*   (2006.01)
(Continued)

(52) U.S. Cl.
CPC ...... *H02M 3/28* (2013.01); *H05B 6/666* (2013.01)

(58) Field of Classification Search
CPC ................................ H05B 6/666; H02M 3/28
USPC .................. 363/16, 20, 50, 55, 56.01, 56.05; 257/173, 500; 361/18
See application file for complete search history.

(56) References Cited

U.S. PATENT DOCUMENTS

| 5,608,595 | A  | 3/1997 | Gourab et al. |
| 6,373,731 | B1 | 4/2002 | Iwamura et al. |

(Continued)

FOREIGN PATENT DOCUMENTS

| CN | 101119062 A | 2/2008 |
| CN | 101174788 A | 5/2008 |

(Continued)

OTHER PUBLICATIONS

International Search Report for International Application No. PCT/JP2010/007496, dated Mar. 22, 2011, 1 page.

(Continued)

*Primary Examiner* — Matthew Nguyen
(74) *Attorney, Agent, or Firm* — Brinks Gilson & Lione

(57) ABSTRACT

Provided is a configuration in which it is possible to mount an applied voltage suppression circuit configured to prevent voltage breakdown of a semiconductor switching element, and a set voltage thereof can be inspected without damaging an IC or the like of a peripheral circuit. In a power converter having a semiconductor switching element, an applied voltage suppression circuit configured to suppress a voltage applied to the semiconductor switching element and at least one component of constituent components of a driving circuit which causes the semiconductor switching element to be turned off if the component is absent are transferred to and disposed on a slave substrate (separate unit) which is divided from and electrically connected to a master substrate including the semiconductor switching element, the driving circuit, a control circuit, and the like mounted thereon.

2 Claims, 6 Drawing Sheets

(51) Int. Cl.
   *H02M 3/28* (2006.01)
   *H05B 6/66* (2006.01)

(56) References Cited

U.S. PATENT DOCUMENTS

| | | | |
|---|---|---|---|
| 6,410,964 B1 * | 6/2002 | Shida | 257/356 |
| 7,196,378 B2 * | 3/2007 | Ichikawa | 257/357 |
| 7,733,618 B2 * | 6/2010 | Moon | 361/56 |
| 2001/0030880 A1 | 10/2001 | Miyazaki et al. | |
| 2006/0109691 A1 | 5/2006 | Strijker et al. | |
| 2007/0159751 A1 | 7/2007 | Hussein et al. | |
| 2008/0084642 A1 | 4/2008 | Kato et al. | |
| 2010/0321847 A1 | 12/2010 | Katoh et al. | |

FOREIGN PATENT DOCUMENTS

| | | |
|---|---|---|
| EP | 0 680 147 A2 | 11/1995 |
| EP | 1 122 885 A2 | 8/2001 |
| EP | 1 128 539 A2 | 8/2001 |
| EP | 1 563 595 A1 | 8/2005 |
| JP | 07-135076 A | 5/1995 |
| JP | 11-220878 A | 8/1999 |
| JP | 2006-353093 A | 12/2006 |

OTHER PUBLICATIONS

Extended European Search Report in corresponding European Application No. 10838982.6, dated Jan. 19, 2015, 9 pages.

* cited by examiner

POWER CONVERTER HAVING SEMICONDUCTOR SWITCHING ELEMENT

This application is a 371 application of PCT/JP2010/007496 having an international filing date of Dec. 24, 2010, which claims priority to JP2009-291724 filed Dec. 24, 2009 and JP2009-291725 filed Dec. 24, 2009, the entire contents of which are incorporated herein by reference.

TECHNICAL FIELD

The present invention relates to a power converter having a semiconductor switching element, and more particularly to providing over-voltage protection means of the semiconductor switching element.

BACKGROUND ART

In recent years, with the progress of semiconductor techniques, power converters treating large power have been of practical use, and, a microwave oven or the like which uses a resonant type high frequency inverter power supply (power converter) of about 20 kHz to 50 kHz, has been put into practical use. In power converters having a semiconductor switching element, over-voltage protection means for preventing breakdown in a withstand voltage of the semiconductor switching element is an essential constituent element.

FIG. 6 is a partial circuit configuration diagram illustrating an example of the over-voltage protection means of the semiconductor switching element shown in an inverter power supply in the related art (for example, refer to Patent Document 1).

In FIG. 6, the inverter power supply 30 is provided with a forced commutation circuit 31 having a withstand voltage quantity set to be lower than a withstand voltage quantity of a semiconductor switching element 3. In a case where an over-voltage equal to or greater than the set voltage occurs across terminals of the semiconductor switching element 3, information regarding the over-voltage is fed back (input) to a base (control terminal) of the semiconductor switching element 3, and the semiconductor switching element 3 is changed from an OFF state to an ON state, thereby suppressing the over-voltage.

Since the inverter power supply 30 shown in the figure is of a resonant type, and the semiconductor switching element 3 is operated at a voltage (collector voltage) across terminals of about 600 V to 650 V, a semiconductor switching element having a withstand voltage of 1000 V is generally selected. Therefore, the set voltage of the forced commutation circuit 31 is set to about 800 V to 900 V in consideration of overshoot at the time of transition in addition to the collector voltage.

RELATED ART DOCUMENTS

Patent Documents

Patent Document 1: JP-A-7-135076

SUMMARY OF THE INVENTION

Problem to be Solved by the Invention

However, in the configuration in the related art, there is a problem in that, when the zener diode of the forced commutation circuit 31 is mounted in a reverse polarity, even a slight collector voltage causes the semiconductor switching element 3 to perform commutation so as to be thermally damaged, but this problem can be solved through inspection using an in-circuit tester or the like after being assembled.

However, if, in relation to the zener diode of the forced commutation circuit 31, a component having a high voltage specification of which a set voltage is incorrect is mounted, forced commutation is not performed despite application of an over-voltage to the semiconductor switching element 3, and thereby there is a problem in that breakdown in a withstand voltage occurs. On the other hand, if a component having a low voltage specification is mounted, the semiconductor switching element 3 intermittently performs forced commutation at all times, and thereby there is a problem in that thermal damage occurs.

These problems can be solved since a set voltage can be checked by applying a high voltage of about 800 V to 900 V described above to the zener diode.

However, since the high voltage is applied, a new problem that breakdown in a voltage of an IC of a circuit such as a controller 32 treating a small signal occurs is caused.

In addition, if the forced commutation circuit 31 is not mounted, there is a problem in that the semiconductor switching element 3 is damaged without forced commutation when an over-voltage is applied thereto.

Further, the forced commutation circuit 31 has polarity and thus necessarily has a configuration where a connection polarity is appropriately defined.

In order to solve the above-described problems in the related art, an object of the present invention is to provide a power converter having a semiconductor switching element capable of preventing breakdown in a withstand voltage of the semiconductor switching element and reliably mounting an applied voltage suppression circuit so as to inspect a set voltage thereof without damaging an IC or the like of a peripheral circuit.

Means for Solving the Problem

In order to solve the problems in the related art, there is provided a power converter having a semiconductor switching element including a first substrate (master substrate) and a second substrate (slave substrate) which are provided independently from each other and are electrically connected to each other, wherein the second substrate is provided with an applied voltage suppression circuit which detects an applied voltage (Vce) to the semiconductor switching element, feeds back a difference signal based on the difference between both voltages to a control terminal of the semiconductor switching element so as to perform forced commutation when the applied voltage is equal to or more than a predetermined voltage value, and suppresses the applied voltage to the vicinity of a predetermined voltage, and at least one component which causes the semiconductor switching element to be turned off if the component is absent of constituent components of a driving circuit, and wherein the first substrate is provided with a driving circuit excluding at least one component, the semiconductor switching element, and the like.

In addition, since a forced commutation circuit of the second substrate has polarity, connection to the first substrate also has polarity.

In the above description, the slave substrate is not limited to a form of being mounted on a printed circuit board, and may be a separate unit divided from the first substrate.

In order to solve the problems in the related art, there is provided a power converter having a semiconductor switching element including: a semiconductor switching element; a driving circuit of the semiconductor switching element; a power control circuit; an applied voltage suppression circuit configured to detect an applied voltage to the semiconductor switching element, and to feed back a difference signal based on difference between the applied voltage and a predetermined voltage to the driving circuit when the applied voltage is the predetermined voltage or more, thereby suppressing the applied voltage to the predetermined voltage or in the vicinity thereof; a first substrate on which the semiconductor switching element, the driving circuit, and the power control circuit are mounted; and a second substrate divided from and electrically connected to the first substrate, wherein the applied voltage suppression circuit is disposed on the second substrate, and wherein the second substrate is provided with at least one component which is connected such that the driving circuit causes the semiconductor switching element to be turned off if the at least one component is absent, or connection means newly provided and equivalent to the at least one component.

Thereby, since the applied voltage suppression circuit can be inspected separately from the first substrate, polarity and a voltage specification thereof can be accurately inspected without voltage breakdown of an IC or the like of a circuit such as a power controller treating a small signal, and thereby it is possible to detect errors.

In addition, in a case where the applied voltage suppression circuit is mistakenly not mounted, an operation of the driving circuit is detected as a form where the semiconductor switching element is turned off and thus an operation of the power converter is stopped, since the applied voltage suppression circuit and at least one component which is newly provided and is connected such that the semiconductor switching element is turned off if the component is absent, or connection means equivalent to the component are mounted on the second substrate.

Advantages of the Invention

According to the power converter having the semiconductor switching element of the present invention, since the zener diode of the applied voltage suppression circuit can be inspected separately from the first substrate (master substrate) having the power controller, the driving circuit, the semiconductor switching element, and the like mounted thereon, polarity and a voltage specification thereof can be accurately inspected without voltage breakdown of an IC or the like of a circuit such as a power controller treating a small signal, and thereby it is possible to detect errors.

Therefore, a voltage breakdown prevention function configured by the applied voltage suppression circuit and the semiconductor switching element is reliably realized.

In addition, although there is a danger that breakdown in a withstand voltage of the semiconductor switching element occurs in a case where the applied voltage suppression circuit is mistakenly not mounted, an operation of the driving circuit is detected as a form where the semiconductor switching element is turned off and thus an operation of the power converter is stopped, since the applied voltage suppression circuit and at least one component (matching resistor) which causes the semiconductor switching element to be turned off if the component is absent are mounted on the second substrate (slave substrate). Therefore, absence of the withstand voltage breakdown prevention function of the switching element is prevented in advance.

Further, although a breakdown voltage of the zener diode of the applied voltage suppression circuit has temperature characteristics, since the applied voltage suppression circuit feeds back information regarding an over-voltage to the semiconductor switching element, a variation in the breakdown voltage due to self-heat emission is small.

Therefore, since the over-voltage is suppressed to the vicinity of a nominal zener voltage, and a stable margin is secured for the withstand voltage of the semiconductor switching element, it is possible to achieve a reliable effect of preventing breakdown in a withstand voltage.

Since the first substrate and the second substrate have a connection structure with polarity, connection of the applied voltage suppression circuit is also correctly made without errors, and thus it is possible to achieve an aimed over-voltage suppression effect. Although natural, the applied voltage suppression circuit is not embedded in the semiconductor switching element, and thus there is no inconvenience in inspection of a withstand voltage of the semiconductor switching element.

MODE FOR CARRYING OUT THE INVENTION

Figure 1:
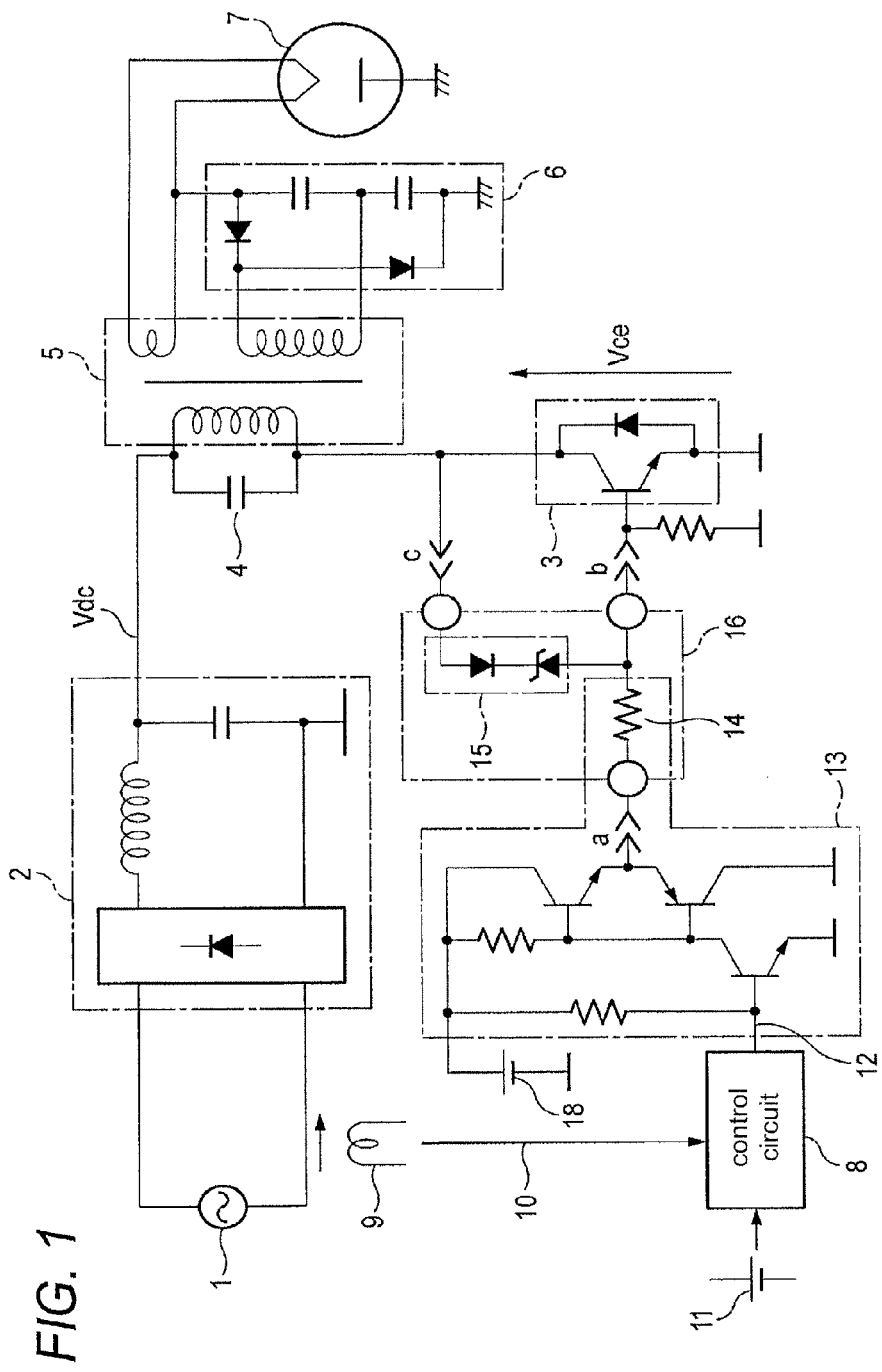
FIG. 1 is a partial circuit configuration diagram of a power converter having a semiconductor switching element according to a first embodiment of the present invention.

A power converter according to a first invention includes: a semiconductor switching element; a driving circuit of the semiconductor switching element; a power control circuit; and an applied voltage suppression circuit configured to detect an applied voltage to the semiconductor switching element, and to feed back a difference signal based on difference between the applied voltage and a predetermined voltage to the driving circuit when the applied voltage is the predetermined voltage or more, thereby suppressing the applied voltage to the predetermined voltage or in the vicinity thereof, wherein the semiconductor switching element, the driving circuit, the control circuit, and the like are mounted on a first substrate, wherein the applied voltage suppression circuit is disposed on a second substrate, and the second substrate is divided from and electrically connected to the first substrate, and wherein the second substrate is provided with at least one component which is contained in constituent components of the driving circuit, and which causes the semiconductor switching element to be turned off if the at least one component is absent. Consequently, a set voltage of the applied voltage suppression circuit can be inspected in a state of the slave substrate, and thus it is possible to prevent breakdown in a voltage of an IC or the like of a circuit such as the power control circuit treating a small signal due to this inspection.

In addition, by transferring at least one component which causes the semiconductor switching element to be turned off if the component is absent of constituent components of the driving circuit, to the slave substrate, when mounting of the slave substrate provided with the applied voltage suppression circuit is forgotten, a form is detected in which the semiconductor switching element is turned off and thus an operation of the power converter is stopped. Therefore, absence of the withstand voltage breakdown prevention function of the switching element is prevented in advance.

Since the slave substrate and the master substrate have a connection structure with polarity, connection of the applied voltage suppression circuit is also correctly made without errors, and thus it is possible to achieve an aimed over-voltage suppression effect.

A power converter according to a second invention includes: a semiconductor switching element; a driving circuit of the semiconductor switching element; a power control circuit; an applied voltage suppression circuit configured to detect an applied voltage to the semiconductor switching element, and to feed back a difference signal based on difference between the applied voltage and a predetermined voltage to the driving circuit when the applied voltage is the predetermined voltage or more, thereby suppressing the applied voltage to the predetermined voltage or in the vicinity thereof; a first substrate on which the semiconductor switching element, the driving circuit, the power control circuit, and the like are mounted; and a second substrate divided from and electrically connected to the first substrate, wherein the applied voltage suppression circuit is disposed on the second substrate, and wherein the second substrate is provided with connection means newly provided and equivalent to at least one component which is connected such that the driving circuit causes the semiconductor switching element to be turned off if the at least one component is absent. Consequently, a set voltage of the applied voltage suppression circuit can be inspected in a state of the second substrate, and thus it is possible to prevent breakdown in a voltage of an IC or the like of a circuit such as the power control circuit treating a small signal due to this inspection.

In addition, by disposing the connection means equivalent to at least one component which is newly provided and is connected such that the semiconductor switching element is turned off if the component is absent on the slave substrate, when mounting of the second substrate provided with the applied voltage suppression circuit is forgotten, an operation of the driving circuit is detected as a form where the semiconductor switching element is turned off and thus an operation of the power converter is stopped. Thereby, absence of the withstand voltage breakdown prevention function of the switching element is prevented in advance.

Hereinafter, embodiments of the present invention will be described with reference to the drawings. In addition, the present invention is not limited to the embodiments.

First Embodiment

FIG. 1 is a partial circuit configuration diagram of a power converter having a semiconductor switching element according to a first embodiment of the present invention.

A DC voltage Vdc obtained by converting a commercial power supply 1 into a DC power supply using a rectifying and smoothing circuit 2 is converted into a high frequency power supply through a high frequency switching operation of a semiconductor switching element 3. The high frequency power supply is input to a primary side of a high voltage (voltage boost) transformer 5 which is connected in parallel to a resonant capacitor 4. A boosted secondary side output is converted into a DC high voltage power supply which is biased to a magnetron 7 by a high voltage rectifying circuit 6.

A power control circuit 8 compares input current information 10 obtained by a current transformer 9 detecting an input current from the commercial power supply 1 with a reference signal 11, and varies a pulse signal 12 which is input to a driving circuit 13 such that the two substantially correspond with each other. The driving circuit 13 converts impedance of the pulse signal 12 so as to be input to a control terminal of the semiconductor switching element 3 via a matching resistor 14. The matching resistor 14 has a function of restricting a current output to the control terminal of the semiconductor switching element 3 such that the driving circuit 13 does not suffer overload.

An applied voltage suppression circuit 15 monitors an applied voltage (Vce) to the semiconductor switching element 3, and feeds back a difference signal (current signal) between a predetermined voltage (set voltage) and the applied voltage (Vce) to the control terminal of the semiconductor switching element 3 when the applied voltage is increased to the predetermined voltage (set voltage) value or more for whatever reason, thereby performing forced commutation. Thereby, the applied voltage suppression circuit 15 can suppress the applied voltage (Vce) to the semiconductor switching element 3 to the vicinity of a predetermined set voltage.

Figure 2:
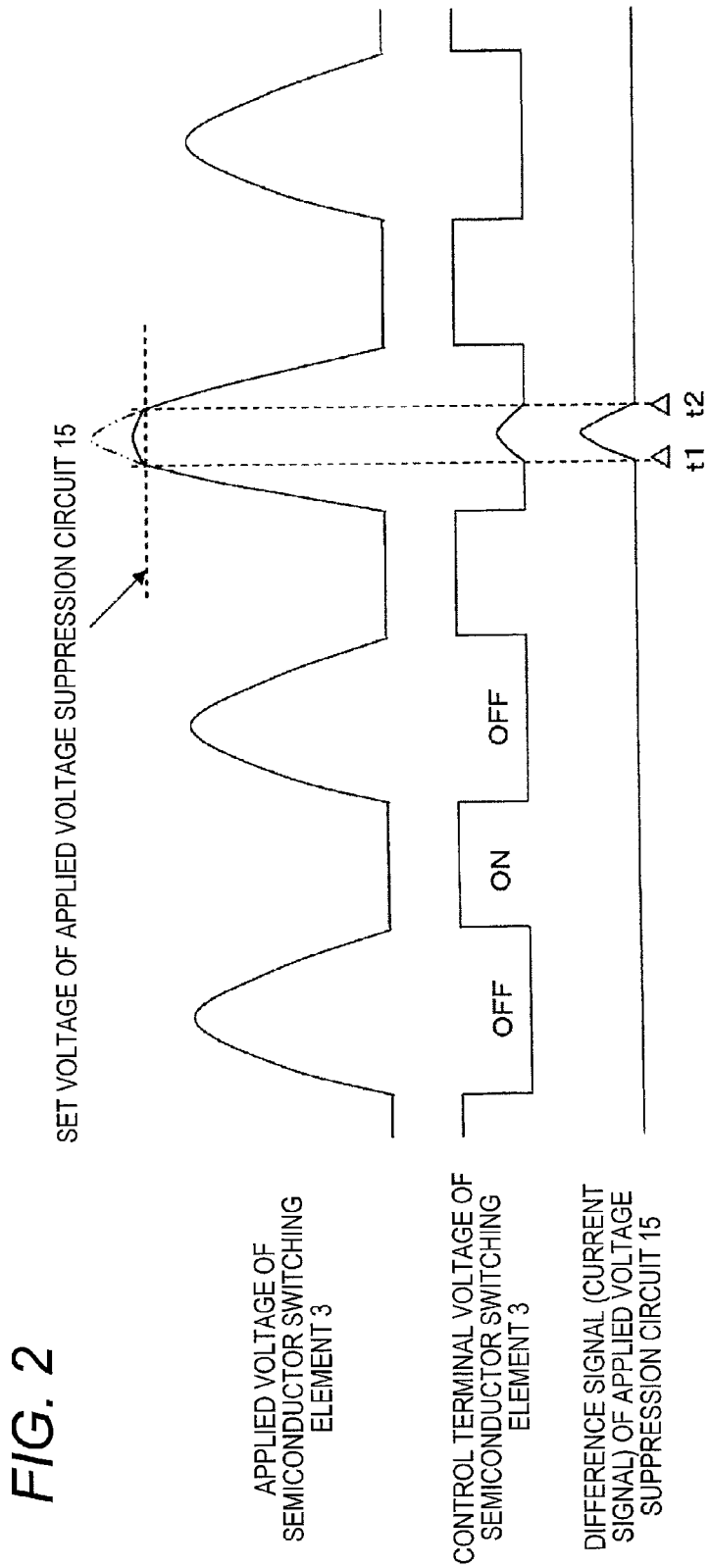
FIG. 2 is a waveform diagram of the respective portions of the power converter having the semiconductor switching element according to the first embodiment of the present invention.

FIG. 2 is a waveform diagram of the respective portions when the applied voltage suppression circuit 15 is operated so as to perform forced commutation for the semiconductor switching element 3 and the applied voltage (Vce) to the semiconductor switching element 3 is suppressed to the vicinity of a predetermined voltage (set voltage) value. The semiconductor switching element 3 in a normal operation is operated so as to switch between an ON operation and an OFF operation at a voltage equal to or less than a set voltage of the applied voltage suppression circuit 15 with the resonant waveform as shown in FIG. 2 in response to a signal from the driving circuit 13. A voltage for generating this resonant waveform is determined depending on a time width or the like of the previous ON operation.

However, during a time period when the applied voltage is increased to the set voltage value or more for some reason, for example, due to the application of a lightning surge, a time period of the time points t1 to t2 in the figure, as shown in FIG. 2, the applied voltage suppression circuit 15 feeds back a difference signal (current signal) between the applied voltage (Vce) and the set voltage value to the control terminal of the semiconductor switching element 3 so as to perform commutation only during this time period and thereby suppresses the applied voltage (Vce) which is to be increased as in the dotted line to a voltage denoted by the solid line.

Figure 3:
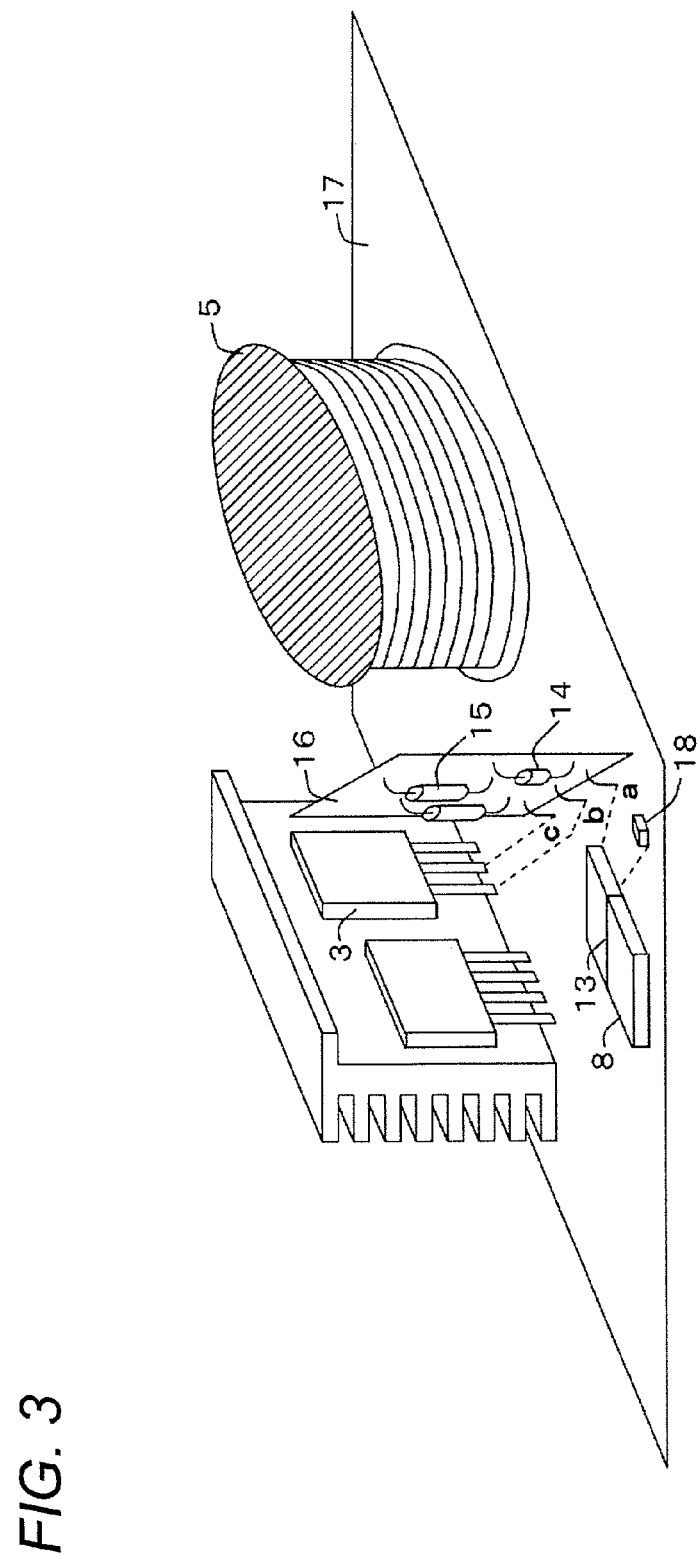
FIG. 3 is a partial structural view of the power converter having the semiconductor switching element according to the first embodiment of the present invention.

FIG. 3 is a partial structural view of the power converter having the semiconductor switching element 3 according to the first embodiment of the present invention. As shown in FIG. 3, a slave substrate 16 (second substrate) where the applied voltage suppression circuit 15 and the matching resistor 14 of the driving circuit 13 are transferred and disposed is configured separately from a master substrate 17 (first substrate) which has the semiconductor switching element 3, the power control circuit 8, the driving circuit 13, the high voltage transformer 5, and the like mounted thereon, but they are electrically connected to each other via connection parts a, b and c.

The connection parts a, b and c which are shown as the same reference signs in FIG. 1 may be connectors for connecting a substrate to another substrate. A connection direction between the slave substrate 16 and the master substrate 17 is appropriately defined by setting variable pitches between connection terminals of the connection parts a, b and c, and a connection polarity between the applied voltage suppression circuit 15 having polarity and the semiconductor switching element 3 are correctly made.

Here, a description will be made of an operation of the high frequency inverter power supply in a case of forgetting mounting (electrical connection) of the slave substrate 16 where the applied voltage suppression circuit 15 is disposed on the master substrate 17.

Naturally, an over-voltage suppressing function for the semiconductor switching element 3 through the forced commutation operation is not performed.

However, the matching resistor 14 which is to be interposed between the driving circuit 13 and the semiconductor switching element 3 is transferred to the slave substrate 16 and thus is not connected to the semiconductor switching element 3 which maintains a turned-off state. For this reason, the applied voltage (Vce) to the semiconductor switching element 3 does not exceed the DC voltage Vdc which is converted into a DC power supply by the rectifying and smoothing circuit 2.

As such, when at least one component of the driving circuit 13 which causes the semiconductor switching element 3 to be turned off if the component is absent is transferred to the slave substrate 16, the high frequency inverter power supply is configured to be operated only in a case where the slave substrate 16 is reliably mounted on the master substrate 17, and thus it is possible to prevent breakdown in a withstand voltage of the semiconductor switching element 3 in advance due to connection forgetting of the applied voltage suppression circuit 15. At least one component of the driving circuit 13 which causes the semiconductor switching element 3 to be turned off if the matching resistor 14 specifically is absent.

In addition, in relation to the applied voltage suppression circuit 15, it is possible to inspect polarity thereof through whether or not a current flows, for example, by applying a minute DC voltage thereto, and to inspect a voltage specification thereof through measurement of a clamping voltage by applying a current pulse thereto. These inspections are performed for the slave substrate 16 independently, and thus an IC such as the power control circuit 8 used for a small signal circuit is not damaged. In addition, these inspections are accurately performed on account of being performed for the slave substrate 16 independently, and thus it is possible to sufficiently secure that the semiconductor switching element 3 is prevented from being damaged due to an over-voltage in an abnormal state.

In addition, since the applied voltage suppression circuit 15 is configured to feed back information regarding an over-voltage to the semiconductor switching element 3, self-heat emission is low and influence of a breakdown voltage on temperature characteristics is small. Therefore, the over-voltage is suppressed to the vicinity of a nominal zener voltage. Thus, since a stable margin is secured for the withstand voltage of the semiconductor switching element 3, it is possible to achieve a reliable effect of preventing breakdown in a withstand voltage.

In addition, it is possible to achieve a reliable effect of preventing breakdown in a withstand voltage by adding only the applied voltage suppression circuit 15 without using a new voltage absorption element since the semiconductor switching element 3 is used in the voltage absorption element when an over-voltage is applied.

Further, since the applied voltage suppression circuit 15 is configured separately from the semiconductor switching element 3, there is no inconvenience in inspection of a withstand voltage of the semiconductor switching element 3.

Second Embodiment

Figure 4:
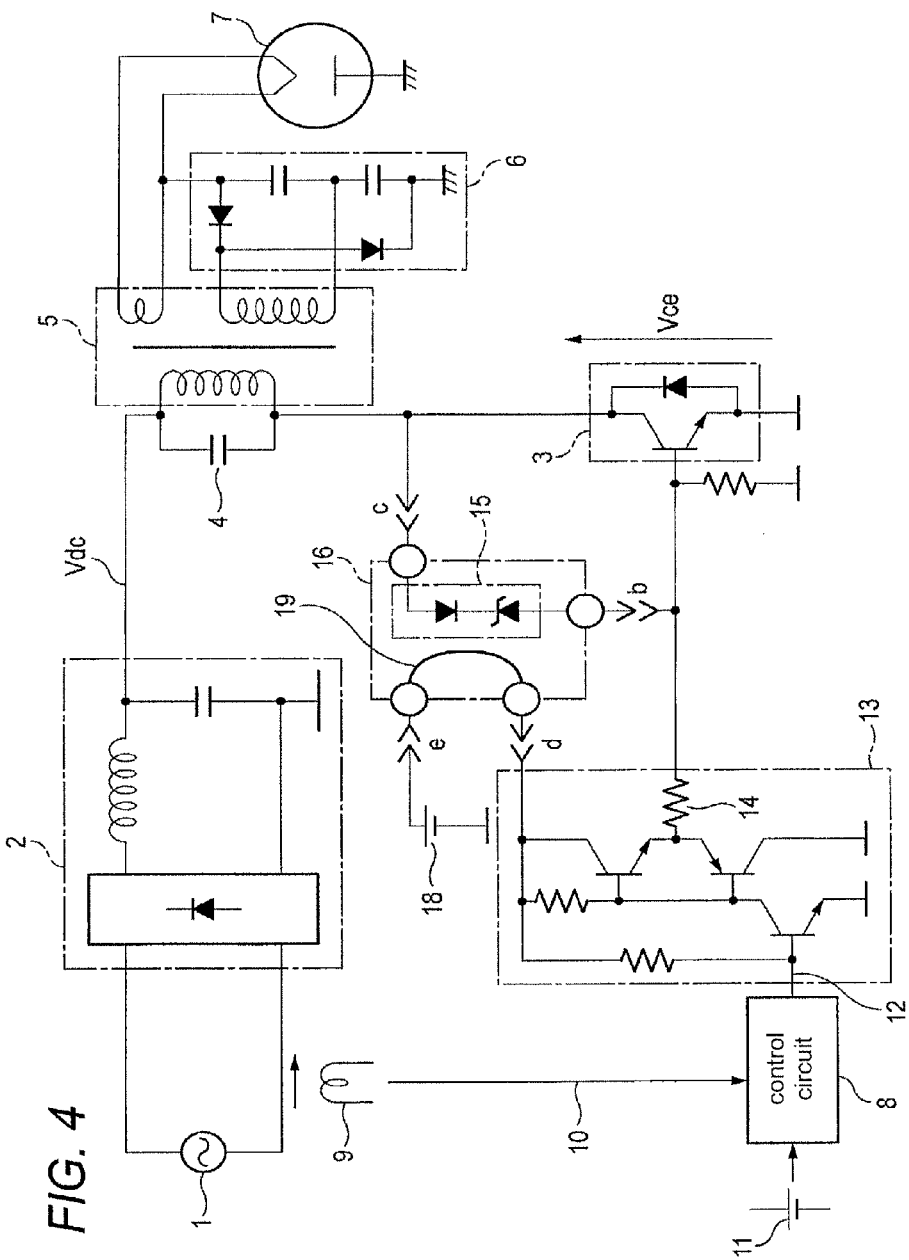
FIG. 4 is a partial circuit configuration diagram of a power converter having a semiconductor switching element according to a second embodiment of the present invention.
Figure 5:
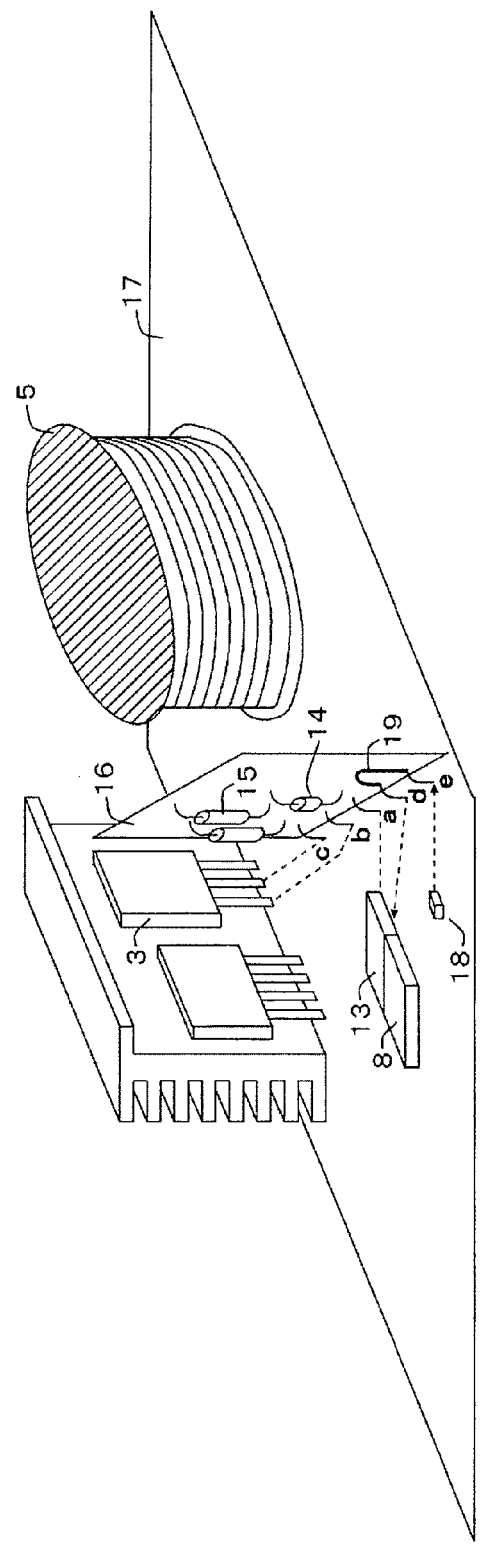
FIG. 5 is a partial structural view of the power converter having the semiconductor switching element according to the second embodiment of the present invention.
Figure 6:
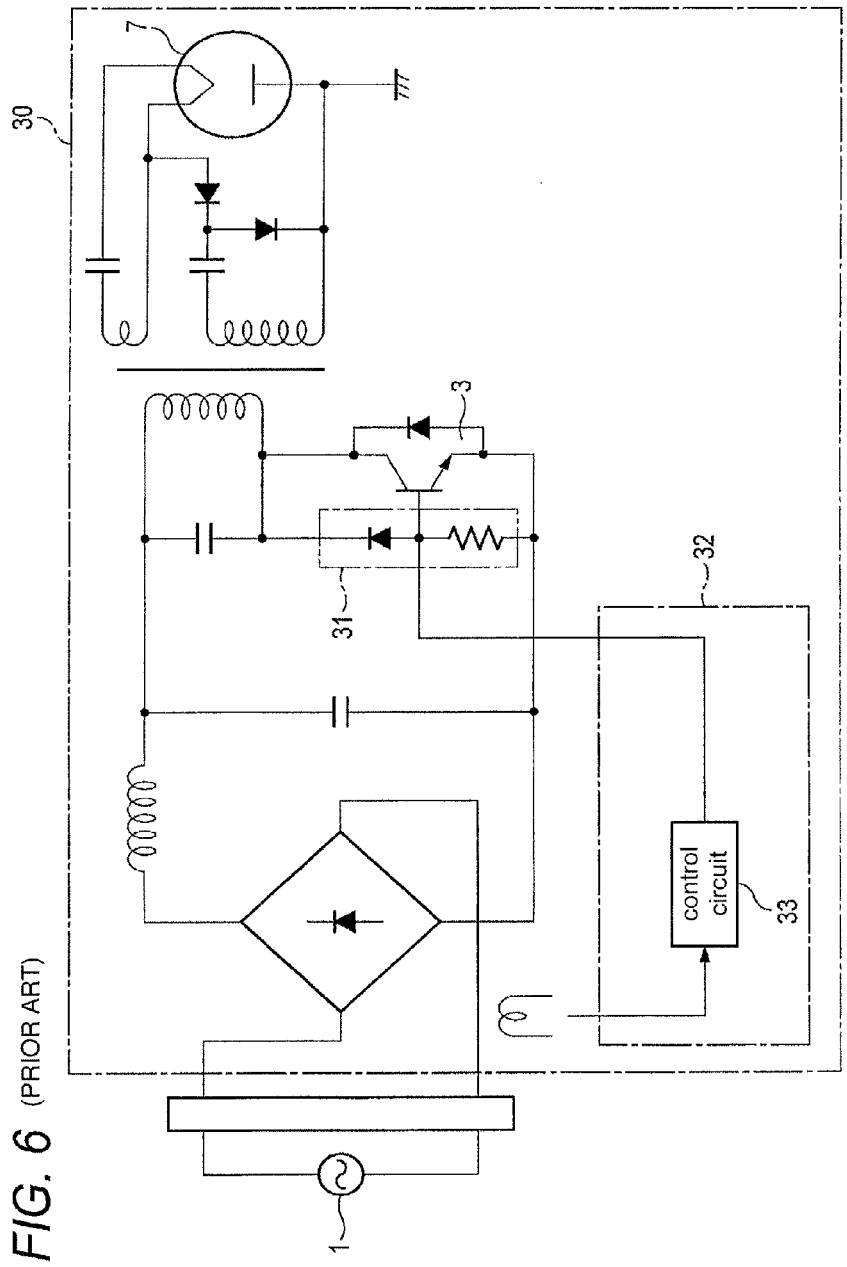
FIG. 6 is a partial circuit configuration diagram of a power converter having a semiconductor switching element in the related art.

FIG. 4 is a partial circuit configuration diagram of a high frequency inverter power supply according to a second embodiment of the present invention, and FIG. 5 is a partial structural view of the high frequency inverter power supply according to the second embodiment of the present invention.

In the same figure, a DC voltage Vdc obtained by converting a commercial power supply 1 into a DC power supply using a rectifying and smoothing circuit 2 is converted into a high frequency power supply through a high frequency switching operation of a semiconductor switching element 3. The high frequency power supply is input to a primary side of a high voltage (voltage boost) transformer 5 which is connected in parallel to a resonant capacitor 4. A boosted secondary side output is converted into a DC high voltage power supply which is biased to a magnetron 7 by a high voltage rectifying circuit 6.

A power control circuit 8 compares input current information 10 obtained by a current transformer 9 detecting an input current from the commercial power supply 1 with a reference signal 11, and varies a pulse signal 12 which is input to a driving circuit 13 such that the two substantially correspond with each other. The driving circuit 13 converts impedance of the pulse signal 12 so as to be input to a control terminal of the semiconductor switching element 3 via a matching resistor 14.

The matching resistor 14 has a function of restricting a current output to the control terminal of the semiconductor switching element 3 such that the driving circuit 13 does not suffer overload. An applied voltage suppression circuit 15 monitors an applied voltage (Vce) to the semiconductor switching element 3, and feeds back a difference signal (current signal) between a predetermined voltage (set voltage) and the applied voltage (Vce) to the control terminal of the semiconductor switching element 3 when the applied voltage is increased to the predetermined voltage (set voltage) value or more for whatever reason, thereby performing forced commutation. Thereby, the applied voltage suppression circuit 15 can suppress the applied voltage (Vce) to the semiconductor switching element 3 to the vicinity of a predetermined set voltage.

The semiconductor switching element 3 in a normal operation is operated so as to switch between an ON operation and an OFF operation at a voltage equal to or less than a set voltage of the applied voltage suppression circuit 15 with the resonant waveform as shown in FIG. 2 in response to a signal from the driving circuit 13. A voltage for generating this resonant waveform is determined depending on a time width or the like of the previous ON operation.

However, during a time period when the applied voltage is increased to the set voltage value or more for some reason, for example, due to the application of a lightning surge, a time period of the time points t1 to t2 in FIG. 2, as shown in FIG. 2, the applied voltage suppression circuit 15 feeds back a difference signal (current signal) between the applied voltage (Vce) and the set voltage value to the control terminal of the semiconductor switching element 3 so as to perform commutation only during this time period and thereby suppresses the applied voltage (Vce) which is to be increased as in the dotted line to a voltage denoted by the solid line.

As shown in FIG. 3, a slave substrate 16 (second substrate) where the applied voltage suppression circuit 15 and the matching resistor 14 of the driving circuit 13 are transferred and disposed is configured separately from a master substrate 17 (first substrate) which has the semiconductor switching element 3, the power control circuit 8, the driving circuit 13, the high voltage transformer 5, and the like mounted thereon, but they are electrically connected to each other via connection parts a, b and c. In addition, a DC power supply 18 is electrically connected to the driving circuit 13 via connection means 19 provided at the slave substrate 16.

The connection parts d and e and the connection parts a, b and c which are shown as the same reference signs in FIG. 4 may be connectors for connecting a substrate to another substrate. A connection direction between the slave substrate 16 and the master substrate 17 is appropriately defined by setting variable pitches between connection terminals of the connection parts a, b, c, d and e, and a connection polarity between the applied voltage suppression circuit 15 having polarity and the semiconductor switching element 3 are correctly made.

Here, a description will be made of an operation of the high frequency inverter power supply in a case of forgetting mounting (electrical connection) of the slave substrate 16 where the applied voltage suppression circuit 15 is disposed on the master substrate 17.

Naturally, an over-voltage suppressing function for the semiconductor switching element 3 through the forced commutation operation is not performed.

However, the DC power supply 18 which is to be connected to the driving circuit 13 loses the connection means 19 since the slave substrate 16 is not mounted, and thus the connection parts d and e are electrically disconnected from each other. Therefore, the driving circuit 13 does not output an ON (: Hi (=High)) signal to the control terminal of the semiconductor switching element 3, and the semiconductor switching element 3 maintains an OFF state. For this reason, the applied voltage thereto does not exceed the DC voltage Vdc which is converted into a DC power supply by the rectifying and smoothing circuit 2.

As such, with regard to the operation of the driving circuit 13, when the connection means 19 which is newly provided and causes the semiconductor switching element 3 to be turned off if the component is absent is transferred to the slave substrate 16, the high frequency inverter power supply is configured to be operated only in a case where the slave substrate 16 is reliably mounted on the master substrate 17, and thus it is possible to prevent breakdown in a withstand voltage of the semiconductor switching element 3 in advance due to connection forgetting of the applied voltage suppression circuit 15.

In addition, the DC power supply 18 and the driving circuit 13 are connected to each other via the slave substrate 16. The newly provided connection means 19 may be a copper foil pattern, a jumper wire, or the like.

In addition, in relation to the applied voltage suppression circuit 15, it is possible to inspect polarity thereof through whether or not a current flows, for example, by applying a minute DC voltage thereto, and inspect a voltage specification thereof through measurement of a clamping voltage by applying a current pulse thereto.

These inspections are performed for the slave substrate 16 independently, and thus an IC such as the power control circuit 8 used for a small signal circuit is not damaged. In addition, these inspections are accurately performed on account of being performed for the slave substrate 16 independently, and thus it is possible to sufficiently secure that the semiconductor switching element 3 is prevented from being damaged due to an over-voltage in an abnormal state.

In addition, since the applied voltage suppression circuit 15 is configured to feed back information regarding an over-voltage to the semiconductor switching element 3, self-heat emission is low and influence of a breakdown voltage on temperature characteristics is small. Therefore, the over-voltage is suppressed to the vicinity of a nominal zener voltage.

Thus, since a stable margin is secured for the withstand voltage of the semiconductor switching element 3, it is possible to achieve a reliable effect of preventing breakdown in a withstand voltage.

In addition, it is possible to achieve a reliable effect of preventing breakdown in a withstand voltage by adding only the applied voltage suppression circuit 15 without using a new voltage absorption element since the semiconductor switching element 3 is used in the voltage absorption element when an over-voltage is applied.

Further, since the applied voltage suppression circuit 15 is configured separately from the semiconductor switching element 3, there is no inconvenience in inspection of a withstand voltage of the semiconductor switching element 3.

In addition, although, in the present embodiment, a case where the semiconductor switching element is a transistor has been described, the semiconductor switching element 3 is not limited to a transistor.

As above, although the embodiments have been described with reference to the drawings, the present invention is not limited to the embodiments. It is clear that a person skilled in the art can conceive of various modifications or alterations within the scope disclosed in the claims, and it is understood that they are naturally included in the technical scope of the present invention.

The present application is based on Japanese applications (JP2009-291724 and JP2009-291725) filed on Dec. 24, 2009, the contents of which are hereby incorporated by reference into this application.

Industrial Applicability

As above, although the power converter having the semiconductor switching element has been described using an example of the high frequency inverter power supply (power converter) driving a magnetron of a microwave oven, the present application may be applied to voltage breakdown preventing means of a semiconductor switching element which is used in a high frequency inverter power supply of an electromagnetic cooker or an inverter driving circuit of a motor, and the semiconductor switching element is not limited to the transistor shown in the figures.

As described above, the power converter having the semiconductor switching element according to the present invention may be applied to voltage breakdown preventing means of a semiconductor switching element which is used in a high frequency inverter power supply of an electromagnetic cooker or an inverter driving circuit of a motor.

The invention claimed is:

1. A power converter having a semiconductor switching element, comprising:
    a semiconductor switching element;
    a driving circuit of the semiconductor switching element that includes a plurality of components;
    a control circuit; and
    an applied voltage suppression circuit configured to detect an applied voltage to the semiconductor switching element, and to feed back a difference signal based on difference between the applied voltage and a predetermined voltage to the driving circuit when the applied voltage is the predetermined voltage or more, thereby suppressing the applied voltage to the predetermined voltage or in the vicinity thereof,
    wherein the semiconductor switching element, a first one or more components of the plurality of components of the driving circuit, and the control circuit are mounted on a first substrate,
    wherein the applied voltage suppression circuit is disposed on a second substrate that is separate from the first substrate, wherein the second substrate includes electrical contacts configured to mate with corresponding electrical contacts of the first substrate when the second substrate is mounted to the first substrate, and wherein at least one other component of the plurality of components of the driving circuit is provided on the second substrate such that removal of the at least one other component causes the semiconductor switching element to remain in an off state.

2. A power converter a having a semiconductor switching element, comprising:

a semiconductor switching element;

a driving circuit of the semiconductor switching element that includes a plurality of components;

a power control circuit;

an applied voltage suppression circuit configured to detect an applied voltage to the semiconductor switching element, and to feed back a difference signal based on difference between the applied voltage and a predetermined voltage to the driving circuit when the applied voltage is the predetermined voltage or more, thereby suppressing the applied voltage to the predetermined voltage or in the vicinity thereof;

a first substrate on which the semiconductor switching element, a first one or more components of the plurality of components of the driving circuit, and the power control circuit are mounted; and a second substrate separate from from the first substrate that includes electrical contacts configured to mate with corresponding electrical contacts of the first substrate when the second substrate is mounted to the first substrate, wherein the applied voltage suppression circuit is disposed on the second substrate, and wherein at least one other component of the plurality of components of the driving circuit is provided on the second substrate such that removal of the at least one other component causes the semiconductor switching element to remain in an off state.

* * * * *